United States Patent Office 3,563,995
Patented Feb. 16, 1971

3,563,995
ALKYL ESTERS OF 1-AZABICYCLO[2.2.2]OCT-2-ENE-3-(4 - CHLORO-3-SULFAMOYLANILINO)-2-CARBOXYLIC ACID
Ian Wellings, 1713 Shadybrook Road,
Wilmington, Del. 19803
No Drawing. Filed Apr. 17, 1969, Ser. No. 817,182
Int. Cl. C07d 39/06
U.S. Cl. 260—293.4          5 Claims

ABSTRACT OF THE DISCLOSURE

Compounds useful as plant growth regulants of the formula:

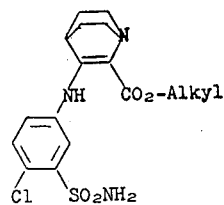

Typical is 1-azabicyclo[2.2.2]oct-2-ene-3-(4-chloro-3-sulfamoylanilino)-2-carboxylic acid, ethyl ester.

BACKGROUND OF THE INVENTION

The control of plant growth continues to be an important effort by man in his desire to produce larger crop yields for the ever increasing population of our earth. Some important agricultural problems that have not been adequately solved to date for many plant species are the following:

(1) A method to provide early uniform germination of weed seeds in species producing seed having extended dormancy. Uniform germination would make weed seeds more vulnerable to adverse growing conditions such as frost or freezing and to chemical herbicide treatment.

(2) A method to shorten the maturation period of plants so that rapid germination of seed and rapid growth of the seedling will preserve stable soil conditions and reduce damage caused to soil by water and wind erosion. Further, such rapid germination and seedling growth would reduce the potential losses from pre-emergence fungus attack.

(3) A method to stimulate bud break in the spring to provide more uniform development of flowers and fruit thus facilitating the use of mechanical harvesting equipment.

(4) A method of stimulating increased crop yields through increased production of flowers.

The compounds of this invention solve many of the above problems in plant species and are thus of significant economic importance. No other group of compounds related to the compounds of the present invention are known to cause similar effects.

SUMMARY OF THE INVENTION

This invention relates to compounds useful for regulating the growth of plants.

The compounds of this invention are represented by structure as follows:

(I)

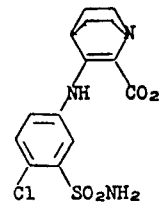

wherein R is alkyl of 1 through 4 carbon atoms.

Preferred because of outstanding seed germination activity at low rates is 1-azabicyclo[2.2.2]oct-2-ene-3-(4-chloro-3-sulfamoylanilino)-2-carboxylic acid, ethyl ester.

PREPARATION OF THE COMPOUNDS

The compounds of Formula I above can be prepared according to the general reaction sequence illustrated below:

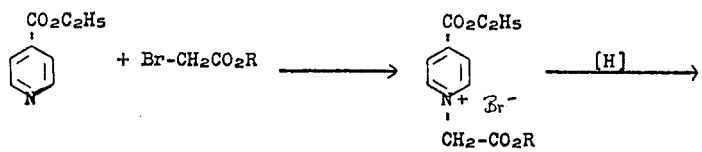

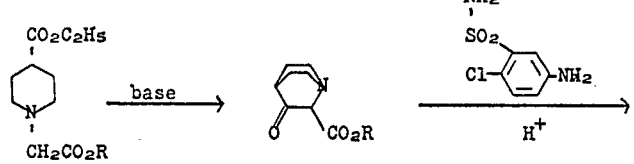

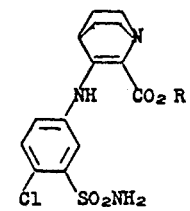

In all of the above R is alkyl of 1 through 4 carbon atoms.

UTILITY

The compounds of Formula I as shown herein regulate plant growth by stimulating the germination of dormant seed, by accelerating the rate of seed germination and subsequent growth of the seedling, by stimulating root growth, by stimulating increased formation of flowers, and by stimulating and accelerating the opening of dormant buds.

As used herein the regulation of plant growth includes the use of the compounds of Formula I on seeds not yet in the soil and on a locus of plant growth such as the surface of soil or by incorporation into soil where seeds are present. Locus of plant growth also is meant to include the area in which growing plant parts such as stems, leaves and buds are exposed.

COMPOSITION

Compositions of this invention suitable to regulate plant growth will include one or more compounds of Formula I and can include surface-active agents, solid or liquid diluents and other materials as desired to produce wettable powders, suspensions, dusts, solutions, granules, pellets, or high-strength compositions.

The surface-active agents, or surfactants, useful in the formulations of this invention act as wetting, dispersing and emulsifying agents which assist dispersion of the active material in water and improve wetting of waxy plant parts and the like by a spray. The surfactants can include such anionic, non-ionic and cationic agents as have been used heretofore in pesticidal compositions of similar type. A detailed list of such agents may be found in "Detergents and Emulsifiers" 1968 Annual (John W. McCutcheon, Inc.).

Anionic and non-ionic surfactants are preferred. Among the anionic surfactants, preferred ones are alkali and alkaline earth salts of alkylarylsulfonic acids, such as dodecylbenzenesulfonates and alkylnaphthalenesulfonates, dialkyl sodium sulfosuccinate esters, sodium lauryl sulfate, sodium N-methyl-N-oleoyltaurate, sodium dodecyl-diphenyl ether disulfonate and the oleic acid ester of sodium isethionate. Among the non-ionic surfactants, preferred ones include octylphenyl polyethylene glycol ethers, dodecylphenyl polyethylene glycol ethers, polyoxyethylene derivatives of sorbitan fatty esters and long-chain alcohols and mercaptans, as well as polyoxyethylene esters of fatty acids.

Preferred dispersants are alkali and alkaline earth salts of lignosulfonic acids, salts of polymerized alkylarylsulfonates which are sold under the "Daxad" and "Darvan" trademarks, as well as methylcellulose, polyvinyl alcohol and the like.

Surfactants are present in compositions of this invention in amounts up to about 20% by weight based on the total weight of the resulting composition. When larger amounts of surfactant are desired, as for further improvement of contact activity, mixing in the spray tank is usually preferred for convenience.

Powder and dust preparations can be made by blending the active ingredient, with or without surfactant, with inert diluents including finely divided solids such as talc, natural clays, pyrophyllite, diatomaceous earth; flours such as walnut shell, wheat, redwood, soya bean and cotton seed; or inorganic substances such as fine silica, calcium phosphate or sulfur. The compositions are made by thoroughly blending the active ingredient with the diluent and other additives. Usually a grinding step, as in a hammer mill or fluid energy mill, is included. The particles in dust and powder preparations are preferably less than 50 microns in average diameter.

Preferred wettable powder formulations will contain 40% or more active ingredient together with sufficient surfactant and inert diluent to permit dispersion in water for spray application. Compositions intended for dust application in the field will generally contain less than 50% active ingredient and a major amount of inert diluent. Direct seed treatment dusts can contain high concentrations of active compound.

Powdered compositions can be converted to granules by adding moisture, treating mechanically and drying. Mechanical devices such as granulating pans, mixers and extruders can be used. Water soluble binders, such as inorganic salts, urea, ligninsulfonates, methylcellulose, starch, starch hydrolysates and the like, can be included in these particular formulations in amounts up to about 25% by weight of the finished granule or pellet. Such materials also aid in disintegration of the pellet and release of the active ingredient under field conditions. Alternatively, a solution or suspension of the active ingredient can be sprayed on the surface of preformed granules of clay, vermiculite, corn cob and the like. Surfactants can also be included in formulations of the latter type. Another suitable method for preforming granules involves compaction of powdered mixes into sheets, followed by granulation.

Suspension formulations can be made in water, or in organic solvents, or in mixtures of water and water-miscible organic solvents in which the active ingredient has a solubility under about 0.1%. The preparations can include, in addition to the active ingredient and liquid carrier, surfactants, viscosity-control agents, anti-microbial agents and other modifiers. They are prepared by grinding the components in a sand mill or pebble mill preferably until the average particle size is under 20 microns. Water is the preferred liquid carrier. Hydrocarbon carriers should have boiling points above about 125° C. for safety in handling. Suspensions in hydrocarbons are suitable for extension in herbicidal or other spray oils, and by inclusion of a suitable emulsifying agent, can also be made sprayable from water.

The compounds of this invention are generally not sufficiently soluble in cheap, water-immiscible inert solvents, for economic use in emulsifiable concentrates. For particular purposes relatively low-strength emulsifiable mixtures can be made in the conventional way using chlorinated hydrocarbons, such as methylene chloride and chloroform, as solvents. Solutions in polar solvents such as dimethylformamide or dimethyl sulfoxide with or without co-solvents such as glycols, ketones or esters can be used directly for low-volume applications or extended with other solvents for conventional spray applications.

In addition to use in spray applications to soil or growing plants, the compounds of this invention can be applied to seed before planting. Wettable powder, dust, liquid suspension, and solution formulation are all suitable for use in various commercial seed treating equipment. When high loadings of particulate matter on seed are required from aqueous applications it is sometimes advantageous to include from 3% to 15% by weight of a water-soluble film-forming polymer, such as polyvinyl alcohol or methylcellulose, in the formulation. Alternatively, a non-phytotoxic emulsifiable hydrocarbon oil can be used. Sufficient dye or pigment should be incorporated in the formulation or mixed in the tank to color the treated seed distinctly.

All compositions can contain minor amounts of additives to reduce foam, inhibit corrosion, prevent claying, reduce caking, etc. The conditions of need for and use of such additives are generally known in the art.

APPLICATION RATES

The active compounds of this invention can be used on a wide variety of crops and other plants including weeds. They can be applied to soil or other growth substrate in plant growth regulant amounts. Such amounts are rates from 0.1 to 500 kilograms of active ingredient per hectare. Preferred rates of soil application range from 0.5 to 100 kilograms per hectare. The treatment directly to seed can be made at rates from 1 to 1000 grams of active ingredient per 50 kilograms of seed. Preferred rates of seed treatment range from 10 to 500 grams per 50 kilograms of seed. The composition also can be applied directly to plants or plant parts. The foliar treatment to obtain plant growth regulation is made in plant growth regulant amounts. Such amounts are rates from 1 to 50,000 p.p.m. of the active ingredient or 0.01 to 100 kilograms per hectare. Preferred rates of foliage treatments are from 10 to 10,000 p.p.m. or 0.1 to 10 kilograms per hectare.

The following additional examples are provided to set forth the invention in further detail. In all examples, unless specifically excepted, all percents or parts given are by weight.

EXAMPLE 1

A solution of 30.2 parts of ethyl isonicotinate and 33.4 parts of ethyl bromoacetate in 78.9 parts of ethanol is allowed to stand overnight at room temperature. The mixture is then heated at reflux temperature for four hours. The resulting solution of 1-carbethoxymethyl-4-carbethoxypyridinium bromide is used directly for the next step.

The solution of the pyridinium bromide is placed in an agitated hydrogenation autoclave together with 2.0 parts of 10% palladium on charcoal and hydrogenated at 90° C. under an initial pressure of 100 atmospheres. Slightly more than the calculated amount of hydrogen is absorbed within 30 to 60 minutes. The mixture is cooled to 25° C. and the catalyst is separated by filtration and washed with 39.5 parts of ethanol. The filtrate is evaporated to dryness in vacuo and the semi-crystalline residue of 1-carbethoxymethyl-4-carbethoxypiperidine hydrobromide is taken up in 120 parts of ice-cold water. The solution is added to 224 parts of chloroform and an ice-cold solution of 30.0 parts of potassium carbonate in 50 parts of water is added gradually with stirring. After the carbon dioxide evolution has subsided, the mixture is thoroughly mixed and the organic layer is drawn off and washed once with 40 parts of water. After drying over anhydrous magnesium sulfate, the chloroform solution is concentrated to give an oily residue. Distillation of this residue under high vacuum gives a main fraction of 1-carbethoxymethyl-4-carbethoxypiperidine, B.P. 111–113° C. at 0.2 mm.

A suspension of 16.0 parts of potassium in 57.1 parts of dry toluene is made up in a three-necked flask fitted with a stirrer, a pressure-equalizing addition funnel and a condenser connected to a source of dry nitrogen. The air in the flask is replaced by an atmosphere of dry nitrogen that is maintained until the reaction mixture is decomposed. The flask is heated in an oil bath until the toluene begins to reflux gently. As soon as the potassium is molten, it is pulverized by vigorous stirring, and 19.2 parts of absolute ethanol are added through the addition funnel. After the potassium has disappeared, the temperature is raised to 130° C. and a solution of 40.0 parts of 1-carbethoxymethyl-4-carbethoxypiperidine in 86.6 parts of dry toluene is added. The mixture is stirred and heated for an additional three hours.

The resulting solution is cooled to 0° C. and decomposed by careful addition of 116 parts of 10 N hydrochloric acid. The aqueous phase is separated from the mixture and the toluene layer is extracted with two 58-part portions of 10 N hydrochloric acid. The aqueous extracts are combined and the aqueous solution is treated with saturated aqueous potassium carbonate solution until it is alkaline to litmus. Solid potassium carbonate is added until a thin slurry is obtained, and the slurry is extracted with four 70.8-part portions of ether. The combined ether extracts are dried over anhydrous magnesium sulfate and filtered. The filtrate is saturated with dry hydrogen chloride gas to give a precipitate of ethyl 3-quinuclidinone-2-carboxylate hydrochloride which, on recrystallization from ethanol/ether, has a melting point of 184–186° C.

A solution of 23.4 parts of the keto ester hydrochloride, 20.7 parts of 4-chloro-3-sulfamoylaniline (prepared by catalytic hydrogenation of 4-chloro-3-sulfamoylnitrobenzene) and 0.2 part of iodine in 105 parts of glacial acetic acid is heated at 60° C. for 30 minutes and then stirred overnight at room temperature. The resulting red-brown solution is poured into 1000 parts of water and the cloudy suspension obtained is filtered through Celite® to give a clear filtrate. The filtrate is cooled to 0° C. and made basic with concentrated ammonium hydroxide solution. The precipitate which forms is removed by filtration and recrystallized from aqueous dimethylformamide to give the desired product, 1 - azabicyclo[2.2.2]oct-2-ene-3-(4-chloro-3-sulfamoylanilino)-2-carboxylate, ethyl ester, M.P. 240–242° C.

The active compounds is formulated as follows:

| | Percent |
|---|---|
| 1-azabicyclo[2.2.2]oct-2-ene-3-(4-chloro-3-sulfamoylanilino)-2-carboxylic acid, ethyl ester | 50 |
| Dioctyl sodium sulfosuccinate | 1.5 |
| Crude calcium lignin sulfonate | 2 |
| Low-viscosity methylcellulose | 1.5 |
| Attapulgite | 45 |

The ingredients are thoroughly blended, passed through an air mill, to produce an average particle size under 15 microns, reblended, and sifted through a U.S.S. No. 50 sieve (0.3 mm. opening) before packaging.

The above formulation is suspended in water at such concentrations that a uniform spray delivers the active ingredients at rates ranging from 1 to 10 milligrams per square meter. The spray is applied onto a mixture of seeds including wild oat, Kentucky bluegrass and De Kalb 622 hybrid corn which are spread out on moist germination blotters. The seeds are then incubated under conditions favorable for germination for a period of 14 days. The percentage of germinated wild oat and Kentucky bluegrass seed is increased by 50% over control seed treated with water. In addition the growth in height of wild oats is increased 150% and Kentucky bluegrass growth is increased 50% over the growth of seed treated with water. The corn seed of the De Kalb 622 hybrid variety develops root systems 60% greater than the water-treated controls.

EXAMPLE 2

The synthesis procedure of Example 1 is repeated substituting an equimolar amount of methyl bromoacetate for the ethyl bromoacetate of Example 1 to obtain 1-azabicyclo[2.2.2]oct-2-ene-3 - (4-chloro-3-sulfamoylanilino)-2-carboxylate, methyl ester.

The product is formulated as follows:

| | Percent |
|---|---|
| 1-azabicyclo[2.2.2]oct-2-ene-3-(4-chloro-3-sulfamoylanilino)-2-carboxylic acid, methyl ester | 80 |
| Sodium alkylnaphthalenesulfonate | 2 |
| Sodium ligninsulfonate | 2 |
| Synthetic amorphous silica | 3 |
| Kaolinite | 13 |

The ingredients are thoroughly blended, passed through a hammer mill to produce an average particle size under 40 microns, reblended and sifted through a U.S.S. No. 50 sieve (0.3 mm. openings) before packaging.

The above formulation is suspendend in water at such concentrations that a uniform spray delivers the active ingredients at rates ranging from 1 to 10 milligrams per square meter. The spray is applied onto a mixture of seeds including wild oat, Kentucky bluegrass and De Kalb 622 hybrid corn which are spread out on moist germination blotters. The seeds are then incubated under conditions favorable for germination for a period of 14 days. The percentage of germinated wild oat and Kentucky bluegrass seed is increased by 50% over control seed treated with water. In addition the growth in height of wild oats is increased 150% and Kentucky bluegrass growth is increased 50% over the growth of seed treated with water. The corn seed of the De Kalb 622 hybrid variety develops root systems 60% greater than the water-treated controls.

EXAMPLE 3

The synthesis of Example 1 is repeated substituting an equimolar amount of propyl bromoacetate for the ethyl bromoacetate of Example 1 to obtain 1-azabicyclo[2.2.2]oct-2-ene-3-(4-chloro-3-sulfamoylanilino) - 2 - carboxylate, propyl ester.

The product is formulated as follows:

| | Percent |
|---|---|
| 1-azabicyclo[2.2.2]oct - 2 - ene - 3 - (4-chloro-3-sulfamoylanilino)-2-carboxylic acid, propyl ester | 65 |
| Nonylphenyl polyethylene glycol ether | 3 |
| Sodium lignin sulfonate | 2 |
| Rhodanine B (C.I. 45170) | 2 |
| Polyvinyl alcohol | 7 |
| Synthetic fine silica | 2 |
| Kaolinite | 19 |

The ingredients are blended together and then air-milled to produce an average particle size under 10 microns, reblended, and sifted before packaging. This formulation is particularly suitable for treatment of seeds.

The above formulation is suspended in water at such concentrations that a uniform spray delivers the active ingredients at rates ranging from 1 to 10 milligrams per square meter. The spray is applied onto a mixture of seeds including wild oat, Kentucky bluegrass and De Kalb 622 hybrid corn which are spread out on moist germination blotters. The seeds are then incubated under conditions favorable for germination for a period of 14 days. The percentage of germinated wild oat and Kentucky bluegrass seed is increased by 50% over control seed treated with water. In addition the growth in height of wild oats is increased 150% and Kentucky bluegrass growth is increased 50% over the growth of seed treated with water. The corn seed of the De Kalb 622 hybrid variety develops root systems 60% greater than the water-treated controls.

EXAMPLE 4

The synthesis of Example 1 is repeated substituting an equimolar amount of butyl bromoacetate for the ethyl bromoacetate of Example 1 to obtain 1-azabicyclo[2.2.2]oct-2-ene-3-(4-chloro-3-sulfamoylanilino) - 2 - carboxylate, butyl ester.

The product is formulated as follows:

| | Percent |
|---|---|
| 1-azabicyclo[2.2.2]oct - 2 - ene - 3 - (4-chloro-3-sulfamoylanilino)-2-carboxylic acid, butyl ester | 20 |
| Dimethylformamide | 80 |

The mixture is stirred with warming to produce a solution for direct low-volume application to plant parts. The above formulation is applied to a portion of strawberry field with an ultra-low-volume sprayer at the rate of two kilograms active ingredient per hectare. The application is made at the time the first blossoms are developing. As a consequence of the treatment the treated plants produce more blossoms and a significantly higher final yield than the untreated plants in an adjacent portion of the field.

EXAMPLE 5

| | Percent |
|---|---|
| 1-azabicyclo[2.2.2]oct - 2 - ene - 3 - (4-chloro-3-sulfamoylanilino)-2-carboxylic acid, methyl ester | 25 |
| Hydrated attapulgite | 3 |
| Crude calcium:magnesium lignin sulfonate | 10 |
| Sodium dihydrogen phosphate | 0.5 |
| Water | 61.5 |

The ingredients are ground together in a ball or roller mill until the patricles in suspension have been reduced to diameters under 5 microns.

The above formulation is suspended in water at a concentration of 2000 p.p.m. active ingredient. This suspension is then sprayed to run-off on selected rows in a field of bush beams as the plants are expanding the first trifoliate leaf. At the time of fall bloom, counts of blossoms per plant are made on the plants in the treated and untreated rows. It is found that the treated plants have a 50 to 75 percent increase in blossom formation, resulting in significant increases in harvested beans over those from untreated plants.

EXAMPLE 6

| | Percent |
|---|---|
| 1-azabicyclo[2.2.2]oct - 2 - ene - 3 - (4-chloro-3-sulfamoylanilino)-2-carboxylic acid, ethyl ester | 35 |
| Sodium lignin sulfonate | 5 |
| Sodium pentachlorophenate | 0.5 |
| Hydrated attapulgite | 1 |
| Water | 58.5 |

The components are ground in a continuous sand mill until substantially all particles are below 5 microns width. Many are near 1 micron or less. The effluent from the grinder is passed through a U.S.S. No. 200 sieve (74 microns) to eliminate extraneous material, and is packaged for use.

The above formulation is suspended in water at such concentrations that a uniform spray delivers the active ingredients at rates ranging from 1 to 10 milligrams per square meter. The spray is applied onto a mixture of seeds including wild oat, Kentucky bluegrass and De Kalb 622 hybrid corn which are spread out on moist germination blotters. The seeds are then incubated under conditions favorable for germination for a period of 14 days. The percentage of germinated wild oat and Kentucky bluegrass seed is increased by 50% over control seed treated with water. In addition the growth in height of wild oats is increased 150% and Kentucky bluegrass growth is increased 50% over the growth of seed treated with water. The corn seed of the De Kalb 622 hybrid variety develops root systems 60% greater than the water-treated controls.

EXAMPLE 7

| | Percent |
|---|---|
| 1-azabicyclo[2.2.2]oct - 2 - ene - 3 - (4-chloro-3-sulfamoylanilino)-2-carboxylic acid, methyl ester | 98.5 |
| Silica aerogel | 0.5 |
| Synthetic amorphous fine silica | 1.0 |

The ingredients are blended and ground in a hammer mill to produce a high-strength concentrate essentially all passing U.S.S. No. 50 mesh. This material may then be shipped or formulated in a number of ways. For example, the following 35% dust can be prepared:

| | Percent |
|---|---|
| High-strength concentrate | 35.53 |
| Pyrophyllite | 64.47 |

The materials are thoroughly blended and packaged for use.

The above formulation is used to treat Kentucky bluegrass seed. Seed is tumbled in a closed container containing sufficient composition to result in an application of 25 grams of active ingredient per 50 kilograms of seed. The treated seeds are planted in moist soil in plots adjacent to untreated seed. The grass from the treated seeds emerges more rapidly, produces a heavier stand (50 percent more plants emerge) and more vigorous growth (50 percent increase in height) than the untreated seed.

EXAMPLE 8

| | Percent |
|---|---|
| 1-azabicyclo[2.2.2]oct-2-ene - 3 - (4 - chloro-3 - sulfamoylanilino)-2-carboxylic acid, propyl ester | 10 |
| Attapulgite | 10 |
| Pulverized sericite | 80 |

The active ingredient and attapulgite are blended and passed through a hammer mill to produce particles of active ingredient substantially all below 200 microns. The ground products is blended with sericite until homogeneous and is then packaged.

The above formulation is suspended in water at such concentrations that a uniform spray delivers the active ingredients at rates ranging from 1 to 10 milligrams per square meter. The spray is applied onto a mixture of seeds including wild oat, Kentucky bluegrass and De Kalb 622 hybrid corn which are spread out on moist germination blotters. The seeds are then incubated under conditions favorable for germination for a period of 14 days. The percentage of germinated wild oat and Kentucky bluegrass seed is increased by 50% over control seed treated with water. In addition the growth in height of wild oats is increased 150% and Kentucky bluegrass growth is increased 50% over the growth of seed treated with water. The corn seed of the De Kalb 622 hybrid variety develops root systems 60% greater than the water-treated controls.

EXAMPLE 9

|  | Percent |
|---|---|
| 1-azabicyclo[2.2.2]oct-2-ene - 3 - (4-chloro-3-sulfamoylanilino)-2-carboxylic acid, ethyl ester | 75 |
| Sodium alkylnaphthalenesulfonate | 0.5 |
| C.I. pigment seed No. 48 (C.I. 15865) | 5.0 |
| Talc | 19.5 |

The ingredients are combined, blended and hammer milled to produce a powder in which substantially all of the active ingredient is below 200 microns. This dust can be used to treat seed.

The above formulation is used to treat Kentucky bluegrass seed. Seed is tumbled in a closed container containing sufficient composition to result in an application of 25 grams of active ingredient per 50 kilograms of seed. The treated seeds are planted in moist soil in plots adjacent to untreated seed. The grass from the treated seeds emerges more rapidly, produces a heavier stand (50% more plants emerge) and more vigorous growth (50% increase in height) than the untreated seed.

EXAMPLE 10

|  | Percent |
|---|---|
| Wettable powder of formulation of Example 2 | 15 |
| Gypsum | 69 |
| Potassium sulfate | 16 |

The ingredients are blended in a rotating mixer and water sprayed on to accomplish granulation. When most of the material has reached the desired range of 1.0 to 0.42 mm. (U.S.S. No. 18–40), the granules are removed, dried and screened. Over-size material is crushed to produce additional material in the desired range. These granules contain 12% active ingredient. The above granular formulation is incorporated into soil infested with wild oat seed which can result in a serious weed problem. The compositions are broadcast evenly over the surface at a rate of four kilograms per hectare and thoroughly disked to a depth of 20 cm. The first rain after the above treatment results in sprouting of weed seeds. In the treated area the wild oats sprout rapidly, uniformly and vigorously. A light disking eliminates virtually all of the potential weed threat and a crop can be planted in this soil without serious competition or contamination. The untreated area, on the other hand, supports only a few wild oats seedlings and after a light disking additional weeds continue to pose a threat to the crop.

EXAMPLE 11

|  | Percent |
|---|---|
| 1-azabicyclo[2.2.2]oct - 2 - ene - 3-(4-chloro-3-sulfamoylanilino)-2-carboxylic acid, propyl ester | 20 |
| Anhydrous sodium sulfate | 10 |
| Calcium/magnesium ligninsulfonate | 5 |
| Sodium alkylnaphthalenesulfonate | 1 |
| Sodium dihydrogen phosphate | 1 |
| Calcium/magnesium bentonite | 30 |
| Kaolinite | 32 |

The ingredients are blended, hammer-milled and then moistened with about 15% water. The mixture is extruded as ca. 3 mm. diameter cylinders and out as extruded to produce 3 mm. x 3 mm. pellets. These can be used as such after drying, or the dried pellets can be crushed to pass a U.S.S. No. 20 sieve (0.84 mm. openings). The fraction held on a U.S.S. No. 40 sieve (0.42 mm. openings) is then packaged for use and the fines recycled.

The above granular formulation is incorporated into soil infested with wild oat seed which can result in a serious weed problem. The compositions are broadcast evenly over the surface at a rate of four kilograms per hectare and thoroughly disked to a depth of 20 cm. The first rain after the above treatment results in sprouting of weed seeds. In the treated area the wild oats sprout rapidly, uniformly and vigorously. A light disking eliminates virtually all of the potential weed threat and a crop can be planted in this soil without serious competition or contamination. The untreated area, on the other hand, supports only a few wild oat seedlings and after a light disking additional weeds continue to pose a threat to the crop.

EXAMPLE 12

|  | Percent |
|---|---|
| 1-azabicyclo[2.2.2]oct-2 - ene - 3 - (4-chloro-3-sulfamoylanilino)-2-carboxylic acid, butyl ester | 10 |
| Starch | 2 |
| Gypsum | 88 |

The active ingredient and starch, together with a like amount of gypsum are passed through a hammer mill so as to give particles of active ingredient substantially below 100 microns. The ground material is blended with the remaining diluent. This mixture is then compacted at the equivalent or about 20,000 lb. per square inch (1,400 kg./cm.²) and then broken into granules. The granular particles in the range of U.S.S. No. 15–50 mesh (1.19–0.30 mm.) are packaged. Oversize and undersize products are recycled.

The above granular formulation is incorporated into soil infested with wild oat seed which can result in a serious weed problem. The compositions are broadcast evenly over the surface at a rate of four kilograms per hectare and thoroughly disked to a depth of 20 cm. The first rain after the above treatment results in sprouting of weed seeds. In the treated area the wild oats sprout rapidly, uniformly and vigorously. A light disking eliminates virtually all of the potential weed threat and a crop can be planted in this soil without serious competition or contamination. The untreated area, on the other hand, supports only a few wild oat seedlings and after a light disking additional weeds continue to pose a threat to the crop.

The isopropyl, isobutyl, sec-butyl and t-butyl esters of 1-azabicyclo[2.2.2]oct-2-ene - 3 - (4 - chloro-3-sulfamoylanilino)-2-carboxylic acid can be synthesized and used in the manner of the compounds of the foregoing examples and are included within the scope of compounds shown by Formula I.

I claim:
1. A compound of the formula:

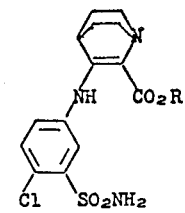

wherein R is alkyl of 1 through 4 carbon atoms.

2. A compound of claim 1 which is 1-azabicyclo[2.2.2] oct-2-ene - 3 - (4 - chloro-3-sulfamoylanilino)-2-carboxylic acid, methyl ester.

3. A compound of claim 1 which is 1-azabicyclo[2.2.2] oct-2-ene - 3 - (4 - chloro-3-sulfamoylanilino)-2-carboxylic acid, ethyl ester.

4. A compound of claim 1 which is 1-azabicyclo[2.2.2]oct-2-ene - 3 - (4 - chloro-3-sulfamoylanilino)-2-carboxylic acid, propyl ester.

5. A compound of claim 1 which is 1-azabicyclo[2.2.2]oct-2-ene - 3 - (4 - chloro-3-sulfamoylanilino)-2-carboxylic acid, butyl ester.

References Cited

UNITED STATES PATENTS 2,075,359   3/1937   Salzberg et al. _____ 424—250

OTHER REFERENCES

Chem. Abstracts, vol. 60: 1697h, Grob et al., 1964.

NORMA S. MILESTONE, Primary Examiner

S. D. WINTERS, Assistant Examiner

U.S. Cl. X.R.

260—295, 294.3; 71—94, 77

PO-1050
(5/69)

UNITED STATES PATENT OFFICE
CERTIFICATE OF CORRECTION

Patent No. 3,563,995      Dated February 16, 1971

Inventor(s) Ian Wellings

It is certified that error appears in the above-identified patent and that said Letters Patent are hereby corrected as shown below:

Following the title of the patent, and the inventor's name and address appearing at lines 1 to 6 of column 1, inse the following phrase -- assignor to E. I. du Pont de Nemours and Company, Wilmington, Delaware, a corporation of Delaware Signed and sealed this 8th day of June 1971.

(SEAL)
Attest:

EDWARD M. FLETCHER, JR.
Attesting Officer

WILLIAM E. SCHUYLER, JR.
Commissioner of Patents